P. CORRIGAN.
Screw-Valves.

No. 141,697.

Patented August 12, 1873.

Witnesses:
A. W. Almqvist
James T. Graham

Inventor:
Philip Corrigan
Per Munn & Co.
Attorneys.

UNITED STATES PATENT OFFICE.

PHILIP CORRIGAN, OF NEW YORK, N. Y.

IMPROVEMENT IN SCREW-VALVES.

Specification forming part of Letters Patent No. 141,697, dated August 12, 1873; application filed July 5, 1873.

*To all whom it may concern:*

Figure 1:
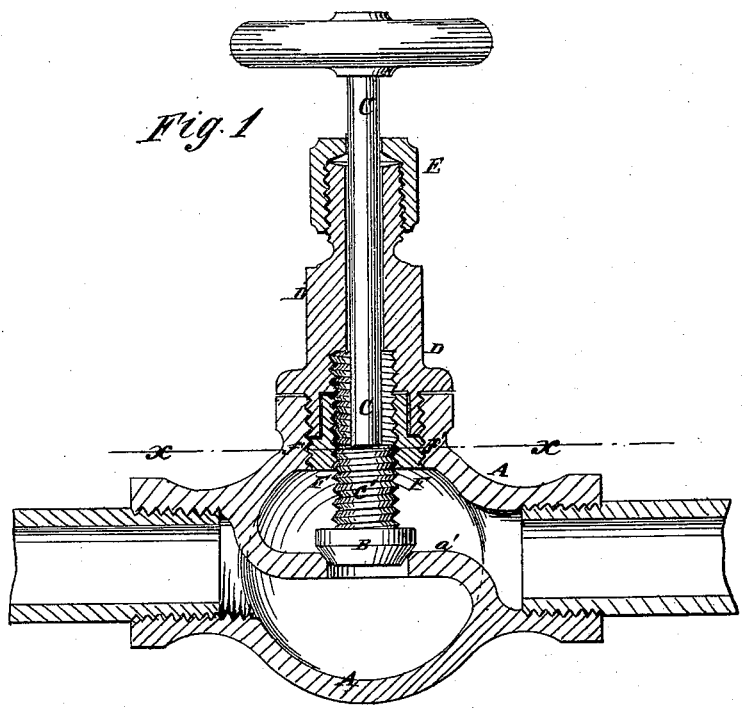
Figure 2:
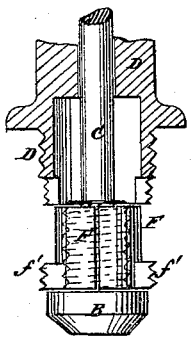
Figure 3:
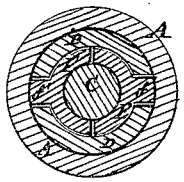

Be it known that I, PHILIP CORRIGAN, of the city, county, and State of New York, have invented a new and useful Improvement in Screw-Valves, of which the following is a specification:

Figure 1 is a detail sectional view of my improved valve. Fig. 2 is a detail view, partly in section, of the cap-nut, valve-stem, and sectional nut. Fig. 3 is a detail section taken through the line $x\,x$, Fig. 1.

Similar letters of reference indicate corresponding parts.

My invention has for its object to furnish an improved valve which shall be so constructed that the valve-plug may be conveniently ground to its seat without detaching the valve from its connections. The invention consists in the nut made in sections and provided with lugs having screw-threads cut upon their outer surfaces, in combination with the screw of the valve-stem, the cap-nut, and the body of the valve, as hereinafter fully described.

I will describe my invention as applied to a globe-valve; but do not wish to limit myself to that use, as it may be applied to various other screw-valves.

A represents the body of the valve, and $a'$ is the partition in which is formed the valve-seat, in which the plug B rests. C is the valve-stem, which passes out through the cap-nut D, to the outer end of which is attached a stuffing-box, E. The inner part of the nut D screws into the hole in the side of the body A. In the inner end of the nut D is formed a tubular cavity larger than the screw $c'$ formed upon the inner part of the valve-stem C. F is a tubular nut, which is made in two halves or sections. The sectional nut F is made with a smooth outer surface and with a screw-thread upon its inner surface fitting into the screw $c'$ of the valve-stem C. Upon the outer surface of the inner end of the sections of the nut F are formed lugs $f'$, which fit into notches in the inner end of the cap-nut D. Upon the outer surface of the lugs $f'$ are formed screw-threads corresponding with the screw-threads cut upon the outer surface of the inner end of the cap-nut D, so that the sectional nut F may be kept in place by the said screw-threads.

With this construction, when the valve-plug B requires to be ground into its seat the cap-nut D is screwed out and the valve-stem C screwed back as far as it will go. The valve-stem C is then pushed forward, carrying the sectional nut F with it, which sections drop off. The cap-nut D is then screwed back into the screw-hole of the body A, and serves as a guide for the valve-stem C, so that the plug B can be readily ground into its seat. The cap-nut D is then removed and the sectional nut F replaced, and the valve is ready for use.

Having thus described my invention, I claim as new and desire to secure by Letters Patent—

The nut F made in sections and provided with lugs $f'$ having screw-threads cut in their outer surfaces, in combination with the screw $c'$ of the valve-stem C, the cap-nut D, and the body of the valve, substantially as herein shown and described.

PHILIP CORRIGAN.

Witnesses:
 T. B. MOSHER,
 C. SEDGWICK.